March 8, 1966  E. C. WELCH  3,239,738
STEPPER MOTOR CIRCUITS
Filed March 6, 1961  3 Sheets-Sheet 1
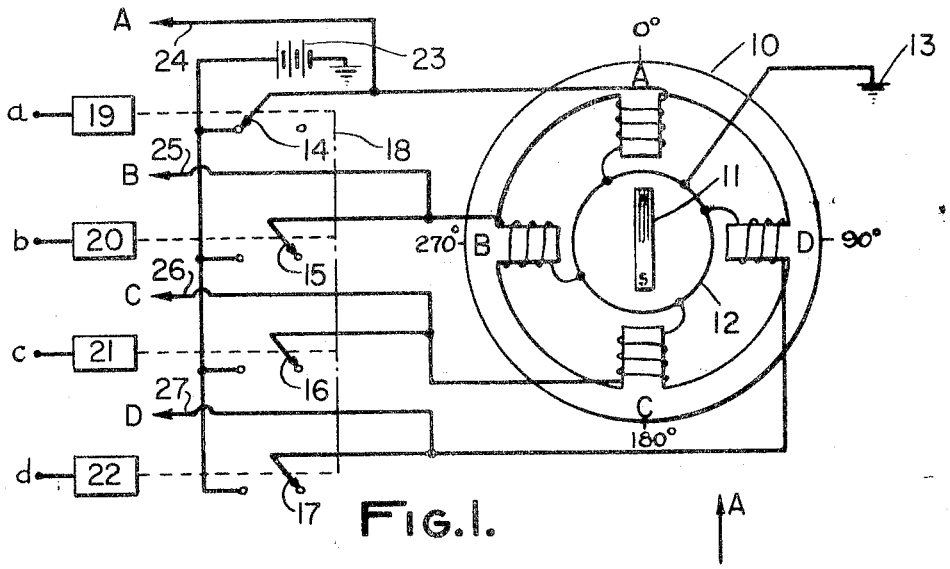
FIG.1.
FIG.2.
| 90° STEPS | | | |
|---|---|---|---|
| CW | | CCW | |
| COILS | DEG. | COILS | DEG. |
| A | 0° | A | 0° |
| D | 90° | B | 270° |
| C | 180° | C | 180° |
| B | 270° | D | 90° |
FIG.3.
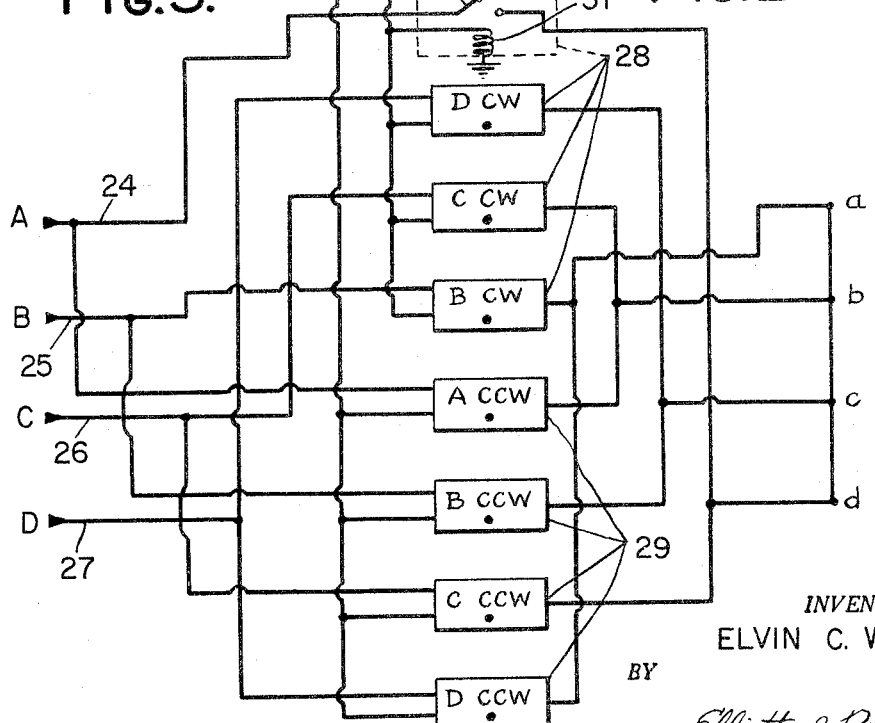
FIG.4.
INVENTOR.
ELVIN C. WELCH
BY
Elliott & Pastoriza
ATTORNEYS March 8, 1966  E. C. WELCH  3,239,738
STEPPER MOTOR CIRCUITS
Filed March 6, 1961  3 Sheets-Sheet 2
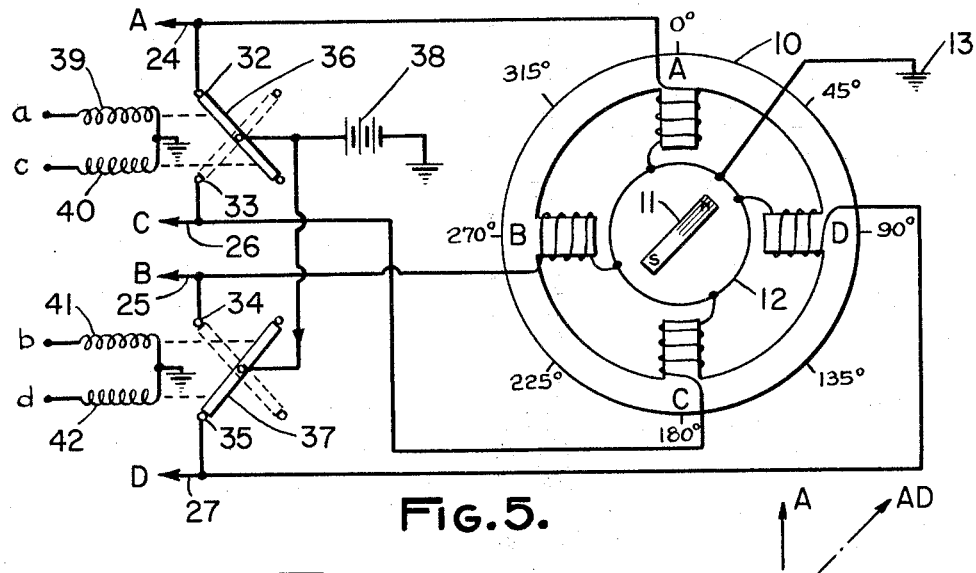
Fig. 5.
Fig. 6.
| 90° STEPS | | | |
|---|---|---|---|
| CW | | CCW | |
| COILS | DEG. | COILS | DEG. |
| AD | 45° | AD | 45° |
| CD | 135° | AB | 315° |
| CB | 225° | CB | 225° |
| AB | 315° | CD | 135° |
Fig. 7.
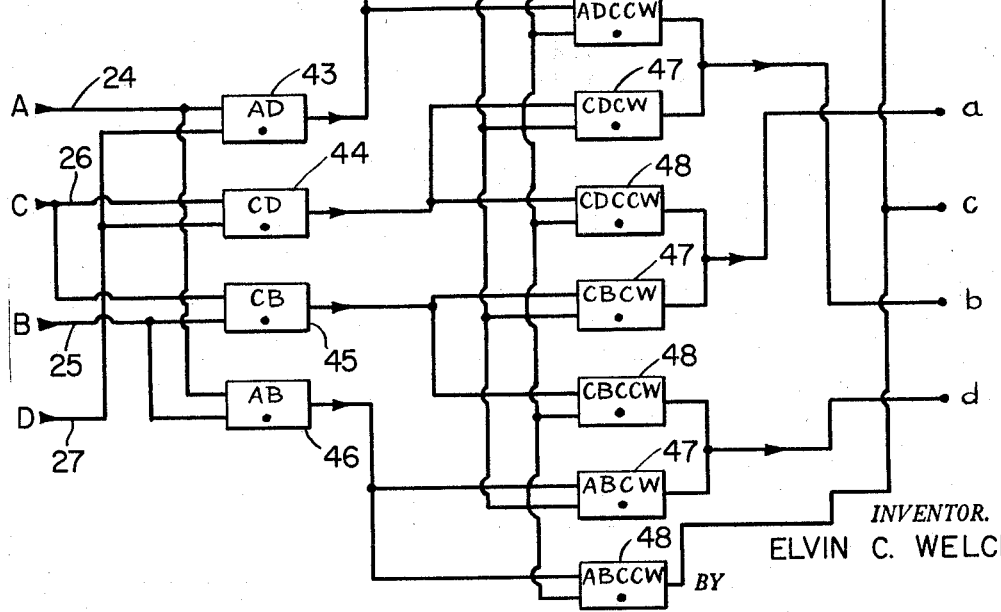
Fig. 8.
INVENTOR.
ELVIN C. WELCH
BY
Elliott & Pastoriza
ATTORNEYS

| 90° STEPS | | | |
|---|---|---|---|
| CW | | CCW | |
| VECTOR | DEG. | VECTOR | DEG. |
| AB' | 45 | AB | 315 |
| A'B' | 135 | A'B | 225 |
| A'B | 225 | A'B' | 135 |
| AB | 315 | AB' | 45 |

INVENTOR.
ELVIN C. WELCH
BY
Elliott & Pastoriza
ATTORNEYS

United States Patent Office 3,239,738
Patented Mar. 8, 1966

3,239,738
STEPPER MOTOR CIRCUITS
Elvin C. Welch, Culver City, Calif., assignor, by mesne assignments, to Barton Instrument Corporation, a corporation of Delaware
Filed Mar. 6, 1961, Ser. No. 93,767
6 Claims. (Cl. 318—138)

This invention relates generally to electrical circuits and more particularly to improved circuit and motor combinations to provide discrete shaft rotations in response to electrical pulses.

Stepper motors of the type under consideration operate on the principle of varying the direction of a magnetic rotor by changing the direction of a stator magnetic field through discrete angles in response to electrical pulses.

These types of stepper motors in the past have often required a continuous application of pulses to effect a stepping action. If stepping in both clockwise and counterclockwise directions was required, a continuous train of timing pulses was necessary, these pulses then cooperating with additional pulses, the presence or absence of which would determine the direction of stepping of the motor. In the absence of any pulses, the motor was essentially deenergized, and there was no unique position for the rotor.

In other types of stepper motors, the stepping action has been dependent upon the time duration of the pulse itself, and thus a stepping action would occur both at the initiation of the pulse and at the termination of the pulse.

With the foregoing in mind, it is a primary object of this invention to provide improved stepper motors and circuits therefor in which a shaft position is determined and maintained even in the absence of pulses in accordance with a magnetic field orientation determined by previous pulses, either clockwise or counterclockwise, applied to the motor.

More particularly, it is an object of this invention to provide circuit means for operating suitable electromagnetic field producing means to enable stepping of the direction of the field in either a clockwise or counterclockwise direction in response to electrical pulses received at clockwise and counterclockwise input terminals respectively. A magnetic rotor will then align itself with the field and thus be stepped in a desired manner and maintained in a desired position without any mechanical limitations except the inertia of the rotor itself.

Briefly, these and other objects and advantages of this invention are attained by providing stator coil means arranged to be energized upon the sequential closing of a plurality of switches. The sequential order of the operation of the switches will determine the discrete angle and direction through which the resulting magnetic field established by the coils will move. Suitable clockwise and counterclockwise input terminals are provided and cooperate with logic circuits connected to receive coil information indicative of the state of the switches and thus to the present position of the magnetic field. These logic circuits in turn are connected to operate the switches in the desired sequence.

A better understanding of the invention will be had by now referring to the accompanying drawings, in which:

FIGURE 1 is a schematic diagram of one example of the invention;

FIGURE 2 is a vector diagram of the magnetic fields capable of being established by the circuit of FIGURE 1;

FIGURE 3 is a table illustrating a given sequential order for clockwise and counterclockwise stepping action;

FIGURE 4 is a schematic block diagram of control circuits for properly energizing the circuit of FIGURE 1;

FIGURE 5 illustrates a second example of the invention;

FIGURE 6 is a vector diagram of the magnetic fields capable of being established by the circuit of FIGURE 5;

FIGURE 7 is a table indicating the sequential order of operation for the circuit of FIGURE 5;

FIGURE 8 is a block diagram of the control circuits for the circuit of FIGURE 5;

FIGURE 9 illustrates a third example of a circuit in accordance with the invention;

FIGURE 10 is a vector diagram of the magnetic fields established by the circuit of FIGURE 9;

Figure 11:
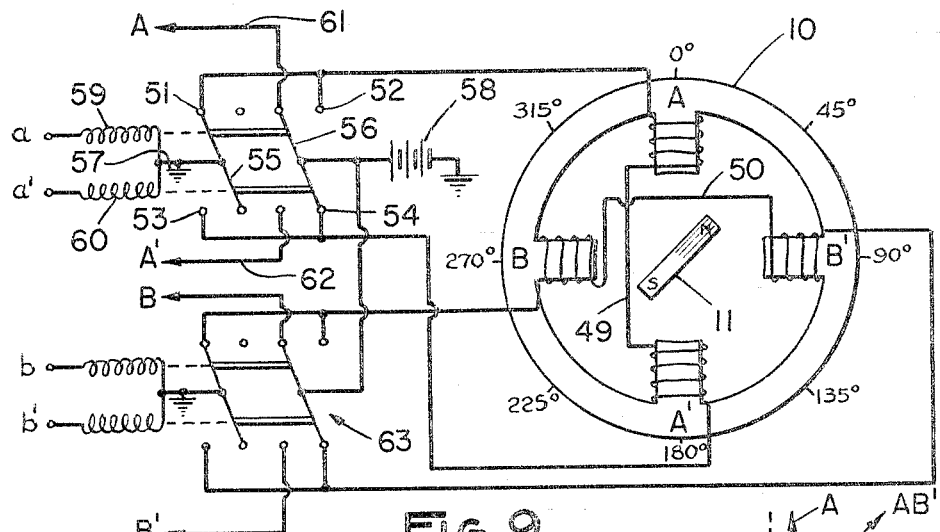
FIGURE 11 is a table illustrating the sequential order of operation for the circuit of FIGURE 9; and, FIGURE 12 is a block diagram of control circuits for operating the circuit of FIGURE 9.

Referring first to FIGURE 1, there is shown a stator coil means comprising a stator ring 10 having four stator poles spaced at ninety degrees and respectively wound with coils A, B, C, and D. In flux coupling relationship with the coils is a single rotor in the form of a magnet 11 having north and south poles as shown. In the particular example illustrated in FIGURE 1, the inner ends of the various coils are connected together by a conductor ring 12 grounded at 13.

The outer ends of the coils A, B, C, and D terminate respectively in switch arms 14, 15, 16, and 17 constituting part of a plurality of switch means. As shown, the switch arms are mechanically connected as indicated at 18 such that only one can be operated at a time. In other words, closing of any one of the switch arms to the left as shown in FIGURE 1 mechanically causes the other three arms to be opened. Lock-out mechanisms of this type, both mechanical or electrical equivalents thereof, are well known in the art and are thus only indicated schematically in FIGURE 1.

Movement of the switch arms may be achieved by any suitable means such as relay coils, these means being designated by boxes 19, 20, 21, and 22, respectively. Each of these boxes includes an input terminal as shown at $a$, $b$, $c$, and $d$. The arrangement is such that a pulse of electrical energy at any of the input terminals $a$, $b$, $c$, or $d$ will cause the corresponding switch arm 14, 15, 16, or 17 to close and remain closed until one of the other switch arms is operated, at which time the closed switch arm will be opened by the means 18.

A source of electrical potential as indicated by the battery 23 is arranged to be connected to the various coils A, B, C, or D through the corresponding switch arms 14, 15, 16, or 17 when closed such as shown for switch arm 14 and coil A.

The switching means also includes coil information inputs in the form of leads 24, 25, 26, and 27, connecting to corresponding coils as indicated by the letters A, B, C, and D. From the connections, it will be clear that when any one of the coils A, B, C, or D is energized, there will also appear a potential on the corresponding coil information input lead 24, 25, 26, or 27. The state of the switch means is thus known by the existence or non-existence of a potential on one of the coil information input leads.

Referring to FIGURE 2, there are shown arrows representing the direction of a magnetic field established by each stator coil. Since only the A coil is energized, the vector A is shown in solid lines. When the switch arm 14 is open and the switch arm 15 is closed, the coil B will be energized as represented by the dotted line vector. Similarly, the coils C and D will be energized upon sequential closing of the switch arms 16 and 17 to provide the vectors as indicated at C and D in FIGURE 2.

It will be immediately evident from the foregoing that a stepping action of the magnetic field and thus the rotor 11 of the motor in FIGURE 1 can be achieved by simply sequentially operating the switch arms 14, 15, 16, and 17. This sequential operation will step the magnetic field and thus the rotor 11 around in a counterclockwise direction. Similarly, by energizing the switches and coils in the sequence A, D, C, and B, the rotor 11 will be made to step around in a clockwise direction.

Referring to FIGURE 3, there is shown a simple table setting forth the above referred to counterclockwise and clockwise rotations indicating which coils should be energized and the degree through which the motor will have moved. Since the corresponding switches and coils A, B, C, or D are energized by application of a pulse to the corresponding inputs $a$, $b$, $c$, or $d$, there is only required that the inputs to the plurality of switches be pulsed in the desired sequential order.

Referring to FIGURE 4, there is shown one type of a control circuit for sequentially operating the switches of FIGURE 1 to effect either clockwise or counterclockwise rotation. This circuit includes a clockwise input terminal indicated at the top part of the drawing by the letters CW and a counterclockwise input terminal designated by the letters CCW. Also included are a first plurality of clockwise logic circuits designated by the boxes 28. In the particular example chosen, these logic circuits constitute coincidence circuits. These circuits have first inputs all connected to receive clockwise pulses from the clockwise input terminal as shown. These circuits also include second input means connected to be responsive to the state of the switches of FIGURE 1 by receiving coil information respectively from the various leads 24, 27, 26, and 25 in FIGURE 1, labeled A, D, C, and B in FIGURE 4. Finally, each of these clockwise coincidence circuits includes a single output which will connect to a proper one of the input terminals $a$, $b$, $c$, or $d$ of the switches such as to effect the desired stepping action in a clockwise direction.

Also included in FIGURE 4 are a plurality of counterclockwise logic or, in the example chosen, coincidence circuits 29 similarly including first input leads all connected to the counterclockwise input terminal as shown and second input leads respectively connected to the coil information leads A, B, C, and D as shown. The outputs of these counterclockwise coincidence circuits connect to the input terminals $a$, $b$, $c$, and $d$ in such a manner as to insure counterclockwise stepping of the rotor 11.

The various coincidence circuits are referred to in the art as "and" circuits and have the property of providing a signal on their output terminals only when both input terminals are energized simultaneously. A simple mechanical switching equivalent for effecting the foregoing is illustrated for the first of the clockwise boxes of FIGURE 4 as including a simple series switch 30 in the coil information input lead A and a simple relay coil 31 connected to the clockwise input terminal. With this arrangement, it will be evident that there will be no signal on the output lead unless there is provided a clockwise signal to energize the relay 31 to close the switch 30 and simultaneously there is provided a potential on the coil information input lead A. If either one of the foregoing signals is lacking, there will be no output signal.

Considering first the clockwise coincidence circuits, the operation of the sequential energization of the switches of FIGURE 1 and consequent clockwise rotation of the rotor 11 will be evident. As will be clear from the table of FIGURE 3, the coils must be energized in the following sequential order: A, D, C, B, etc. Assume first that the switch arm 14 is closed as shown to provide energy from the battery 23 to the coil A and ground at 13. Under these conditions, the remaining switches will be open because of the mechanical lock-out structure 18. Further, there will be generated an electromagnetic field in the direction of the arrow A of FIGURE 2. The rotor 11 will thus be aligned in a vertical direction as shown in FIGURE 1.

Assume now that a clockwise pulse is received. This clockwise pulse will be received in the relay coil 31 of FIGURE 4 to close the switch arm 30 and thus apply the potential existing only in the coil information input lead A shown at 24 in FIGURE 1 to the output of the circuit in FIGURE 4 which is connected to terminal $d$. The same clockwise pulse will be simultaneously received in the remaining three boxes 28 but will have no effect since the second inputs thereto are not energized.

The signal at $d$ will energize the actuating means 22 to throw the switch arm 17 of FIGURE 1 to the left, thereby applying potential from the source 23 to the coil D. Movement of the switch arm 17 to the left will open the switch arm 14 through the mechanical lock-out 18. Thus, the field generated by coil A will be terminated, and coil D will be energized, and the rotor 11 will rotate clockwise ninety degrees.

Upon reception of the next clockwise pulse, the second block in FIGURE 4, designated DCW, will pass an output signal since it is also energized at its second input from the coil information input D. This output signal will energize terminal $c$. Referring again to FIGURE 1, energization of terminal $c$ will close switch arm 16, thereby opening switch arm 17 and applying potential to coil C. The process will continue as long as clockwise pulses are received.

If counterclockwise pulses are received, the reverse sequence of operation takes place as will be readily evident by following through the pulses and the various coil information input leads to the plurality of coincidence circuits 29 and their output connections to the input terminals $a$, $b$, $c$, and $d$.

The foregoing represents a very simple means of providing a ninety degree stepping action. In each instance, the rotor will be stepped through a discrete angle in a direction dependent upon whether a clockwise or counterclockwise pulse is received. Further, the rotor will be retained in its stepped direction until reception of the next pulse.

It will be clear that forty-five degree steps could be effected by energizing the coils in the following sequence: A, AD, D, DC, C, CD, B, BA. The switching arrangement for sequentially operating the coils in this manner would be somewhat more complicated, but exactly the same principles are applicable.

Referring now to FIGURE 5, there is shown a second example of stator coil connections for also effecting ninety degree steps. In this arrangement, two coils are simultaneously energized to provide a greater torque. Towards this end, the outer ends of the respective coils A, B, C, and D are connected into a somewhat modified switching means. As shown, the outer ends of the coils A and C are connected respectively to a first pair of switch terminals 32 and 33 and the outer ends of coils B and D are connected to a second pair of switch terminals 34 and 35. First and second switch arms 36 and 37 in turn are arranged to connect a source of potential 38 to one or the other of the terminals 32, 33, and one or the other of the terminals 34, 35. If the terminals 32 and 33 are considered a first pair of switches and the terminals 34 and 35 a second pair, it will be evident that only one of the switches in the first pair can be operated at a time, and only one of the switches in the second pair can be operated at a time. In other words, if one of the switches in the pair is on, the other of that pair must be off and vice versa.

Actuation of the respective switches may be effected by relay coils such as indicated at 39 and 40 for the first pair of switches and 41 and 42, for the second pair of switches. These coils in turn may be energized respectively by pulses applied to input terminals $a$, $c$, $b$, and $d$. As in the case of FIGURE 1, coil information leads 24, 26, 25, and 27 will be energized when the corresponding coils A, C, B, and D are energized.

Referring to FIGURE 6, there is illustrated a vector diagram indicating the electromagnetic field developed with the switching arrangement shown in FIGURE 5. As shown there are at all times at least two adjacent coils energized. With the switches in the solid line position shown in FIGURE 5, it will be evident that the source 38 is connected through the switch arm 36 and terminal 32 to the coil A and ground at 13. Also, the source 38 is connected through the switch arm 37 and terminal 35 to coil D and to ground. Thus, both coils A and D are energized as indicated by the solid line arrows A and D in FIGURE 6 to provide a resultant magnetic field at forty-five degrees as indicated by the dashed dot vector AD. The rotor 11 will align itself at forty-five degrees in the direction of the vector AD.

To effect a stepping in a clockwise direction through ninety degrees, it will be evident from FIGURE 6 that the field A should be removed and the field coil C energized. The field D should remain energized as shown. This will then result in a vector at 135 degrees, the adjacent energized coils now being C and D. The next step would then be achieved by having coil C remain energized, de-energizing coil D, and energizing coil B.

The foregoing steps are depicted in the table of FIGURE 7 wherein the proper sequential energization of the pairs of adjacent coils for stepping in a clockwise and counterclockwise direction is set forth.

The advantage in the foregoing stepping compared to that of FIGURE 1 is that 1.414 times as much torque can be applied to the rotor by two adjacent coils being energized at the same time.

The control circuit for effecting the sequential switching is illustrated in FIGURE 8 and is very similar to that described in connection with FIGURE 4 except that additional "and" circuits are necessary.

Referring specifically to FIGURE 8, these additional circuits are indicated at 43, 44, 45, and 46 and are connected to the coil information leads 24, 26, 25, and 27 as shown. These circuits provide signals at their outputs only when two adjacent coils AD, CD, CB, or AB are energized. Since the switch arms 36 and 37 of FIGURE 5 must be in one position or the other, two adjacent coils must always be energized thereby providing potential on corresponding information leads A, C, B, or D.

As in the case of FIGURE 4, there are provided a plurality of clockwise coincidence circuits designated 47 in FIGURE 8 grouped somewhat differently from that shown in FIGURE 4 and a plurality of counterclockwise coincidence circuits 48. First inputs to the circuits 47 and 48 are connected respectively to receive clockwise and counterclockwise pulses as indicated by the clockwise and counterclockwise input leads. The second inputs to these coincidence circuits are connected to receive the outputs from the circuits 43, 44, 45, and 46, respectively. The outputs of the clockwise and counterclockwise coincidence circuits 47 and 48 in turn are connected to the input terminals a, c, b, and d to operate the various switches shown in FIGURE 5 in such a manner as to produce the desired stepping action.

In the operation of the circuit of FIGURE 8, assume that coils A and D are energized as indicated by the solid line positions of the switch arms 36 and 37 in FIGURE 5. Under these conditions, the rotor 11 will align itself as shown in FIGURE 5. Further, since both coils A and D are energized, only the coincidence circuit 43 will pass a signal to the second input of the clockwise circuit 47 and counterclockwise circuit 48. There will be no signals from the remaining coincidence circuits 44, 45, and 47 since coils B and C are not energized.

If now a clockwise pulse is received, it will actuate only the coincidence circuit 47 designated ADCW since the condition for an output from this circuit is that both coils A, D, and a clockwise pulse be received. Therefore, the output signal from 47 will be passed to input terminal c causing throwing of the switch arm 36 from its solid to its dotted line position. The switch arm 36 will thus close on terminal 33 and open terminal 32, the result being that the source 28 will then be connected through the switch arm 36 and terminal 33 to the coil C, thereby energizing coil C. Coil A will be de-energized. The rotor 11 will step through nintey degrees to 135 degrees corresponding to the energization of coils C and D as depicted by the table in FIGURE 7.

Energization of the coils C and D will cause an output signal from the coincidence circuit 44 which will be passed to the clockwise coincidence circuit 47 designated CDCW and counterclockwise coincidence circuit 48 designated CDCCW. If another clockwise pulse is received, only the coincidence circuit CDCW will be energized and thus pass a signal to the input terminal b. Referring again to FIGURE 5, a signal on input terminal b will energize relay 41 to throw the switch arm 37 to its dotted line position thereby removing energy from coil D and energizing coil B. Since input terminal b is the only terminal receiving a signal, the switch arm 36 will remain in its previous position thereby maintaining coil C energized. The two adjacent coils energized are now C and B providing a vector field in the direction of 225 degrees to again cause rotation of the rotor 11 in a clockwise direction through an angle of ninety degrees.

Stepping in a counterclockwise direction operates in an identical manner except that the sequence of operation of the plurality of switches is exactly opposite to that for a clockwise direction. Considering, for example, the rotor in any one position, if a counterclockwise pulse is received, a signal will be provided to operate the switch which is immediately previous in the sequential order for clockwise operation in the same manner that in clockwise operation, the next preceding switch in the sequential order is operated.

As a specific example in FIGURE 8, assume that the coils AD are energized and that a counterclockwise pulse is received. In this event, only the coincidence circuit 48 and designated ADCCW will pass a signal to input terminal b, thereby throwing the switch arm 37 to the terminal 34 to energize coil B. Coils A and B will then be energized resulting in a counterclockwise switching from the forty-five degree position of the rotor to 315 degrees.

The various coincidence circuits 47 and 48 are labeled with letters setting forth the conditions that the respectively lettered coils must be energized and that there must also be received either a clockwise pulse if lettered CW or counterclockwise pulse if lettered CCW in order that the circuit yield an output to one of the various input terminals a, c, b, or d. By starting from any set position of the rotor with two adjacent coils energized, the next sequential energization can readily be determined by following through the various connections described in FIGURE 8 in conjunction with the switches of FIGURE 5.

Referring now to a third example as illustrated in FIGURE 9, the stator coils are connected somewhat differently. More specifically, the inner ends of diametrically opposite coils are connected together as indicated at 49 and 50. Further, the diametrically opposite coils are wound such as to provide vectors in like directions so that once the coils are energized, a total vector in one direction which is twice the value resulting from energization of just a single coil is realized. With specific reference to FIGURE 9, the stator coils are designated A and A' positioned at zero degrees and 180 degrees, respectively, and B and B' positioned at 270 degrees and 90 degrees, respectively.

With reference to FIGURE 10, when current is passed from the source 58 through the coil A' to the coil A and to ground there will result a solid line vector as indicated by the letter A; when current is passed in a reverse direction through the coil and then through the coil A' to ground, there results a vector as indicated by the dashed lines A' which is exactly 180 degrees reversed. Similarly, when current passes through the coil B and thence through the inner connection 50 to the coil B', there will be produced a vector indicated by the solid arrow B' in FIGURE 10. When these connections are reversed to pass current through the coil B' and then the coil B, the vector is reversed as indicated by the dashed line designated B in FIGURE 10.

Designating the complete vectors A, A', B, and B', respectively, there may be provided a table as shown in FIGURE 11 illustrating the degrees through which stepping occurs when these electro-magnetic vectors exist. Thus, when the vectors A, B' exist, the rotor will be at forty-five degrees; when the vectors A', B', exist, the rotor will be moved to 135 degrees; when the vectors A', B exist, the rotor will be moved to 225 degrees; and when the vectors AB exist, the rotor will be moved to 315 degrees. If the coils are sequentially energized as just described, clockwise rotation of the rotor will result. Counterclockwise rotation of the rotor can be achieved by properly energized the coils to follow the sequence indicated in the counterclockwise portion of the table of FIGURE 11.

The advantage in the foregoing system of coil energization is that twice as much torque can be developed over the system of FIGURE 5 since all of the coils are at all times energized, only the polarity being changed. The stator windings are thus being employed with maximum efficiency.

In FIGURE 9, there are again provided two pairs of switches. Each pair constitutes a reversing switch means, and since both are identical, description of one will suffice for both. Thus, referring to the upper switch, it will be noted that the outer terminals for the coils A and A' connect to terminals 51, 52, and 53, 54, respectively. Switch arms 55 and 56 are ganged for simultaneous rocking movement. As shown, arm 55 is grounded and arm 56 is connected to a source of potential 58. Simple relay coils 59 and 60 may be used to switch the arms from one position to the other upon receipt of pulses at their input terminals a and a'.

With the switch in the solid line position as shown, current will pass from the source 58 through the switch arm 56 to terminal 54 to the outer end of coil A' up through this coil and the inner connection 49 to the coil A and back to the terminal 51 and through switch arm 55 to ground at 57. If the switch arms 55 and 56 are switched to their opposite positions, energy from the source 58 will pass through the switch arm 56 to the terminal 52 and the outer end of coil A, the inner connection 49 to the coil A', and back to terminal 53 which will then connect through switch arm 55 to ground at 57. Thus, throwing of the switch arms 55 and 56 simply reverses the polarity of the connections to the outer terminals of the coils A and A'.

Coil information input leads are shown at 61 and 62, and these are analogous to the coil information leads A and C of FIGURE 5 and FIGURE 1 in that they will be provided with a potential when their corresponding lettered coil is energized, the notation being such that A indicates that vector A exists and A' indicates that vector A' exists. These leads will derive their potential from the switch arm 56 depending upon its particularly switched position.

The second reversing switch means designated generally by the arrow 63 is identical to that already described except that it is arranged to reverse the polarity from the source 58 to the coils B and B'. Again, there are provided input terminals b and b' which with the terminals a and a' are properly pulsed in a desired sequential order to effect either a clockwise or counterclockwise rotation.

FIGURE 12 illustrates in block form the various "and" coincidence circuits necessary to achieve proper sequential switching of clockwise or counterclockwise rotation. There are again provided a first series of coincidence circuits 64, 65, 66, and 67 connected to the coil information leads A, A', B, and B' to provide proper information to the second inputs of suitable clockwise and counterclockwise coincidence circuits 68 and 69.

The various conditions for output signals from the coincidence circuits 68 and 69 are determined by the lettered notations on the various boxes and the operation, except for the change in notation, is identical to that described in connection with FIGURE 8.

From the foregoing description, it will be evident that the present invention has provided circuits for operating a plurality of switches in a desired sequential order. When used with the stator coils and rotor, there is thus provided a simple means for stepping a shaft through discrete angles. Further, it will be evident that the circuit is such that the rotor will be retained in a given position even after the cessation of any one pulse on the clockwise or counterclockwise terminal and will not move until reception of a next pulse regardless of the time such next pulse is received. Moreover, if the next pulse is a clockwise pulse, the proper switches will be energized to insure stepping in a clockwise direction, and if the next pulse is a counterclockwise pulse, proper switches will be energized to insure a stepping in a counterclockwise direction.

In the three illustrative examples set forth, mechanical type switching means has been shown merely to simplify a following through of the circuits. In actual practice, conventional electronic switching is used such as can be achieved by diodes, transistors, or vacuum tubes, all as is well known to those skilled in the art. It is therefore to be understood that by "switch means" is meant any electronic equivalent thereof. Moreover, "coincidence" circuits constitute only one type of logic circuit; any other logic circuit such as an "or" circuit with inverted output may be used to achieve equivalent results. In addition to the foregoing, while only examples showing ninety degree steps have been set forth and described, it is clear that stepping through any discrete angle, depending upon the number of stator poles and the number of rotor poles, as well as their physical orientation and the manner in which the successive poles are energized, could be realized. It is to be emphasized accordingly that a number of stator poles different from four and a number of rotor poles different from two can be used.

The invention is therefore not to be thought of as limited to any one of the examples set forth.

What is claimed is:

1. A circuit means for energizing magnetic field producing means comprising, in combination: a source of electrical energy; a plurality of switch means for connecting said source to said magnetic field producing means to establish a magnetic field in a given direction dependent upon which of said plurality of switch means are closed and which are open; a clockwise input terminal; a counterclockwise input terminal; first control means for closing and opening said plurality of switch means in a given sequential order in response to reception of electrical pulses on said clockwise input terminal, said first control means comprising a plurality of clockwise logic circuits responsive to pulses on said clockwise input terminal and connected to be responsive to the state of said switch means, each clockwise logic circuit being connected to energize said switch means from its previous state to the state following said previous state in said given sequential order; and second control means for closing and opening said plurality of switch means in the opposite of said sequential order in response to reception of electrical pulses on said counterclockwise input terminal, said second control means comprising a plurality of counterclockwise logic circuits responsive to pulses on said counterclockwise input terminal and connected to be responsive to the state of said switch means, each counterclockwise logic circuit being connected to energize said switch means from its previous state to the state preceding said previous state in said given sequential order.

2. A circuit means according to claim 1, in which said magnetic field producing means comprises stator coils; and a rotor in flux coupling relationship with said stator coils such that said rotor will align itself with said given direction whereby said rotor may be stepped through a discrete angle in a clockwise direction upon receipt of an electrical pulse at said clockwise terminal and through said discrete angle in a counterclockwise direction upon receipt of a pulse at said counterclockwise terminal.

3. A magnetic field producing means according to claim 2, in which said stator coils are four in number spaced at ninety degrees; and said plurality of switch means are four in number each having an input which, upon energization, connects said source to at least one of said coils.

4. A magnetic field producing means according to claim 3, in which said switch means are connected to said stator coils to provide only individual energization of said coils.

5. A magnetic field producing means according to claim 3, in which said switch means are connected to said stator coils to provide energization only of two adjacent coils simultaneously.

6. A magnetic field producing means according to claim 3, in which said switch means are connected to said stator coils to provide energization of diametrically opposite coils simultaneously.

References Cited by the Examiner

UNITED STATES PATENTS

| | | | |
|---|---|---|---|
| 2,706,270 | 4/1955 | Steele | 318—283 |
| 2,774,026 | 12/1956 | Towner | 318—283 |
| 2,922,095 | 1/1960 | Hesse et al. | 318—138 |
| 2,953,735 | 9/1960 | Schmidt | 321—5 |
| 2,994,813 | 8/1961 | Towner et al. | 318—283 |
| 3,041,516 | 6/1962 | Bailey | 318—443 |

ORIS L. RADER, *Primary Examiner.*

MILTON O. HIRSHFIELD, *Examiner.*